United States Patent
Ko

(10) Patent No.: US 11,971,274 B2
(45) Date of Patent: Apr. 30, 2024

(54) METHOD, APPARATUS, COMPUTER PROGRAM, AND COMPUTER-READABLE RECORDING MEDIUM FOR PRODUCING HIGH-DEFINITION MAP

(71) Applicant: THINKWARE CORPORATION, Seongnam-si (KR)

(72) Inventor: Suk Pil Ko, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 16/952,978

(22) Filed: Nov. 19, 2020

(65) Prior Publication Data

US 2021/0148722 A1    May 20, 2021

(30) Foreign Application Priority Data

Nov. 20, 2019    (KR) .................. 10-2019-0149600

(51) Int. Cl.
*G06V 20/64* (2022.01)
*G01C 21/00* (2006.01)
*G01C 21/36* (2006.01)

(52) U.S. Cl.
CPC ..... *G01C 21/3638* (2013.01); *G01C 21/3602* (2013.01); *G01C 21/367* (2013.01);
(Continued)

(58) Field of Classification Search
CPC ............ G06K 9/00208; G01C 21/00; G01C 21/38–3896; G01C 21/3804–3859;
(Continued)

(56) References Cited

U.S. PATENT DOCUMENTS

2010/0091020 A1 *  4/2010  Kmiecik .............. G01C 21/28
                                                    345/427
2011/0282578 A1 * 11/2011  Miksa ................. G06F 16/29
                                                    701/532
(Continued)

FOREIGN PATENT DOCUMENTS

WO    WO-2010068185 A1 *  6/2010  ....... G06F 17/30241
WO    WO-2020202158 A1 * 10/2020  ......... G06K 9/00624

OTHER PUBLICATIONS

A. Mastin, J. Kepner and J. Fisher, "Automatic registration of LIDAR and optical images of urban scenes," 2009 IEEE Conference on Computer Vision and Pattern Recognition, 2009, pp. 2639-2646, doi: 10.1109/CVPR.2009.5206539. (Year: 2009).*

(Continued)

*Primary Examiner* — Jeffrey C Boomer
*Assistant Examiner* — Paul Allen
(74) *Attorney, Agent, or Firm* — Bridgeway IP Law Group, PLLC; Sang Ho Lee; Hyun Woo Shin

(57) ABSTRACT

There is provided a method for producing a high-definition (HD) map. The method includes detecting an object of a road area from the aerial image, extracting a two-dimensional (2D) coordinate value of the detected object, calculating a three-dimensional (3D) coordinate value corresponding to the 2D coordinate value by projecting the extracted 2D coordinate value onto point cloud data that configures the MMS data, and generating an HD map showing a road area of the aerial image in three dimensions based on the calculated 3D coordinate value.

16 Claims, 15 Drawing Sheets

(52) U.S. Cl.
CPC ...... *G01C 21/3811* (2020.08); *G01C 21/3822* (2020.08); *G01C 21/3841* (2020.08); *G01C 21/3852* (2020.08); *G01C 21/3867* (2020.08); *G06V 20/647* (2022.01)

(58) Field of Classification Search
CPC ........... G01C 21/32; G06T 7/00; G06T 15/00; G06T 17/00; G06T 19/00; G05D 1/00
USPC .................................................. 701/400–541
See application file for complete search history.

(56) References Cited

U.S. PATENT DOCUMENTS

| | | | | |
|---|---|---|---|---|
| 2013/0216139 | A1* | 8/2013 | Nakagawa | G06V 10/44 382/201 |
| 2015/0078624 | A1* | 3/2015 | Fukuda | G08G 1/168 382/104 |
| 2016/0005145 | A1* | 1/2016 | Seitz | G06T 3/0093 382/154 |
| 2018/0096463 | A1* | 4/2018 | Kim | G06T 17/20 |
| 2019/0130182 | A1* | 5/2019 | Zang | G06K 9/00651 |
| 2019/0163993 | A1* | 5/2019 | Koo | G06K 9/52 |
| 2019/0291723 | A1* | 9/2019 | Srivatsa | G06T 19/006 |
| 2020/0160559 | A1* | 5/2020 | Urtasun | G06K 9/629 |
| 2020/0175720 | A1* | 6/2020 | Hsu | G06T 7/75 |
| 2020/0258202 | A1* | 8/2020 | Cai | G06T 5/005 |
| 2020/0393265 | A1* | 12/2020 | Piao | G01C 21/3815 |
| 2021/0035314 | A1* | 2/2021 | Shu | G06K 9/34 |

OTHER PUBLICATIONS

M. Javanmardi, E. Javanmardi, Y. Gu and S. Kamijo, "Precise mobile laser scanning for urban mapping utilizing 3D aerial surveillance data," 2017 IEEE 20th International Conference on Intelligent Transportation Systems (ITSC), 2017, pp. 1-8, doi: 10.1109/ITSC.2017.8317833. (Year: 2017).*

Aleksey Boyko, Thomas Funkhouser, "Extracting roads from dense point clouds in large scale urban environment," ISPRS Journal of Photogrammetry and Remote Sensing, vol. 66, Issue 6, Supplement, 2011, pp. S2-S12, ISSN 0924-2716, (Year: 2011).*

* cited by examiner

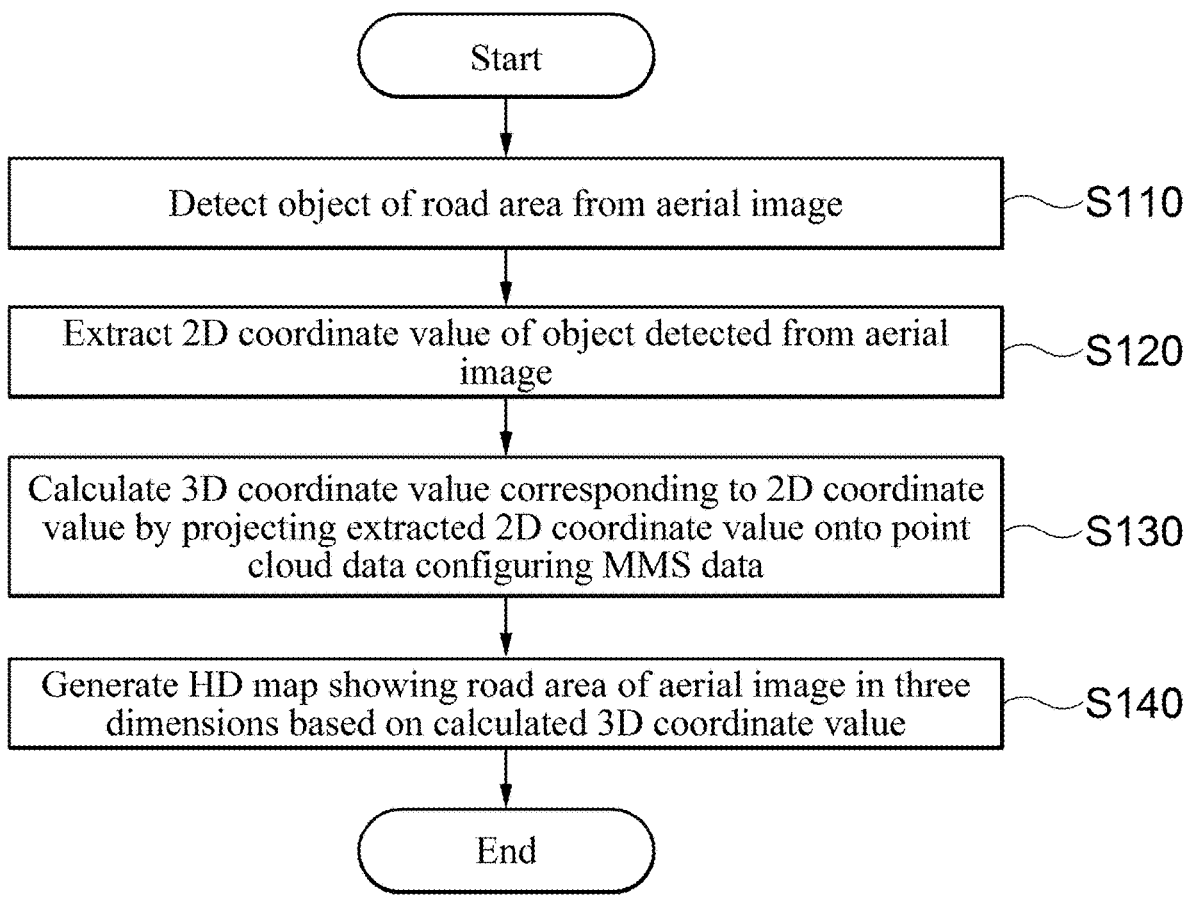

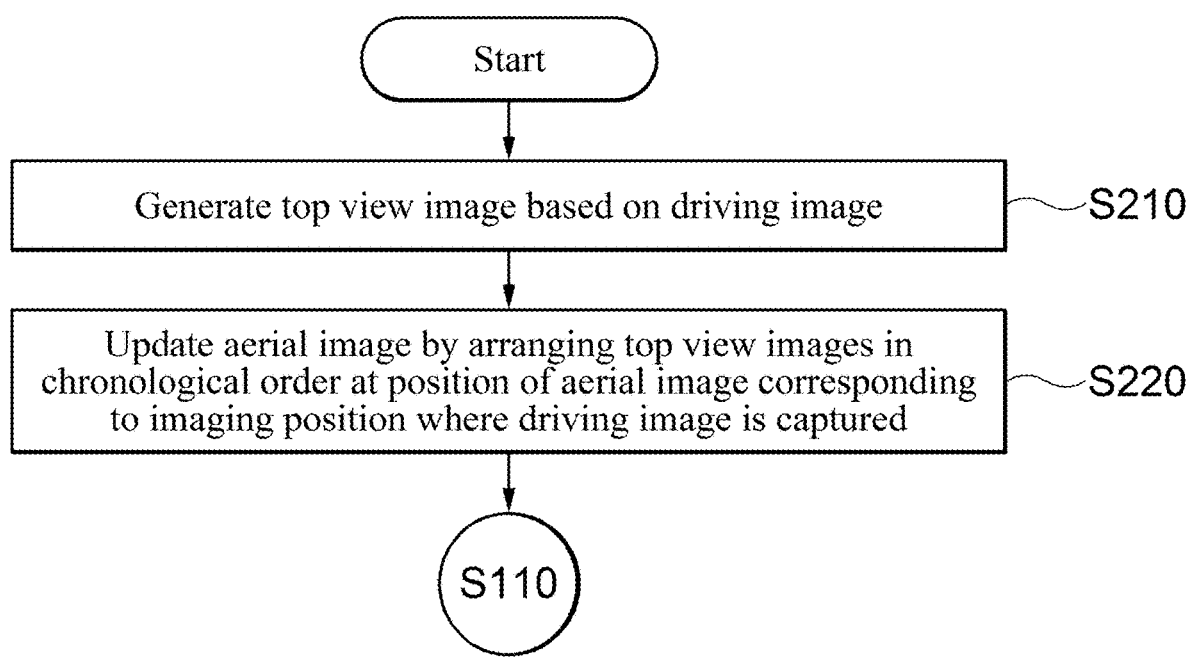

METHOD, APPARATUS, COMPUTER PROGRAM, AND COMPUTER-READABLE RECORDING MEDIUM FOR PRODUCING HIGH-DEFINITION MAP

CROSS-REFERENCE TO RELATED APPLICATION

This application claims the priority and benefit of Korean Patent Application No. 10-2019-0149600 filed on Nov. 20, 2019, with the Korean Intellectual Property Office, the disclosure of which is incorporated herein by reference.

BACKGROUND OF THE INVENTION

1. Field of the Invention

The present invention relates to a method, apparatus, computer program, and computer-readable recording medium for producing a high-definition map using aerial images and mobile mapping system (MMS) data.

2. Description of the Related Art

As vehicle drivers pursue convenience and safety, various technologies to assist vehicle drivers' driving have been developed and applied to vehicles.

As an example, in recent years, vehicles equipped with advanced driver assistance systems (ADAS) including an automatic emergency braking system (AEB) that reduces a speed of a vehicle or stops the vehicle without driver stepping on a braking device in a case of a collision risk, a lane keep assist system (LKAS) that maintains a lane by adjusting a driving direction in a case of lane departure, an advanced smart cruise control (ASCC) that maintains a distance to a vehicle ahead, while running at a predetermined speed, and the like are on sale in full swing.

Such ADAS is becoming increasingly advanced to develop autonomous vehicles.

An autonomous vehicle is a vehicle that accurately localizes a vehicle through multiple operations of sensors mounted on the vehicle, recognizes and determines a surrounding situation, and drives on the road without relying on human control. A global market size of autonomous vehicles is expected to be 18.9 billion in 2020 and autonomous vehicles are expected to reach 75% of all automobile sales by 2050, and as such, autonomous vehicles are considered to be a key technology of the fourth industrial revolution.

In the development of such autonomous vehicles, many factors such as road infrastructure, vehicle-to-vehicle communication, sensor performance, and the like are important.

In particular, the importance of a high-definition map (HD map) including precise coordinate information has emerged in reliably driving an autonomous vehicle by supplementing technical limitations of sensors.

In the related art, an HD map is produced by driving several vehicles equipped with a mobile mapping system (MMS) to acquire 300,000 vertex information and high-resolution driving images per second and post-processing information and the driving images. However, such a related art method is a manual method in which numerous workers perform data simplification and quantification for post-processing, having a problem of high costs and low efficiency.

In addition, the high-definition maps need to be updated continuously for up-to-dateness thereof, and updating the high-definition maps in the related art method described above incurs high cost and requires much time.

SUMMARY

An aspect of the present invention may provide a method, apparatus, computer program, and computer-readable recording medium for producing a high-definition (HD) map, capable of calculating a three-dimensional (3D) coordinate value by projecting a two-dimensional (2D) coordinate value of an object detected from an aerial image onto point cloud data which configures MMS data and producing an HD map showing a road area of the aerial image three-dimensionally based on the calculated 3D coordinate value.

An aspect of the present invention may also provide a method, apparatus, computer program, and computer-readable recording medium for producing a high-definition (HD) map, capable of extracting an image of a road facility from MMS data and a 3D coordinate value of the road facility and producing an HD map reflecting the road facility in three dimensions based on the extracted image and the 3D coordinate value of the road facility.

According to an aspect of the present invention, a method for producing a high-definition (HD) map using an aerial image and mobile mapping system (MMS) data of a mobile mapping system, includes: detecting an object of a road area from the aerial image; extracting a two-dimensional (2D) coordinate value of the detected object; calculating a three-dimensional (3D) coordinate value corresponding to the 2D coordinate value by projecting the extracted 2D coordinate value onto point cloud data that configures the MMS data; and generating an HD map showing a road area of the aerial image in three dimensions based on the calculated 3D coordinate value.

The object of the road area may include at least one of a lane marking, a road surface marking, and a polygon, and the detecting may include, when the object of the road area is detected from the aerial image, classifying the detected object by object type.

The method may further include: allocating road attribute information to the road according to the detected object, wherein the road attribute information may include link information for electronically shaping the road and node information electronically shaping a predetermined point in the link.

The calculating of the 3D coordinate value may include: calculating a height value corresponding to the 2D coordinate value by projecting the detected 2D coordinate value onto the point cloud data configuring the MMS data; and calculating a 3D coordinate value corresponding to the 2D coordinate value based on the calculated height value.

The method may further include: comparing the calculated height value with a surrounding height value to determine whether the calculated height value is an error; and performing an error notification when the calculated height value is determined to be an error value.

The method may further include: detecting a road facility from a driving image configuring the MMS data; and extracting a 3D coordinate value of the detected road facility from the point cloud data configuring the MMS data, wherein, in the generating of the HD map, the HD map reflecting the road facility three-dimensionally may be generated based on the detected image of the road facility and the extracted 3D coordinate value of the road facility.

The method may further include: calculating dummy information and performing data processing for optimizing the generated HD map data by assigning the calculated dummy information as an attribute of the object.

The dummy information may include an offset value corresponding to a distance difference from a reference lane marking and a relative height value corresponding to a height difference from the reference lane marking.

The method may further include: generating a top view image based on a driving image configuring the MMS data; and updating the aerial image by arranging the generated top view image in chronological order on a position of the aerial image corresponding to an imaging position at which the driving image is captured, wherein the method for producing an HD map may be performed using the updated aerial image.

According to another aspect of the present invention, an apparatus for producing a high-definition (HD) map using an aerial image and mobile mapping system (MMS) data of an MMS includes: an aerial image analyzing unit detecting an object of a road area from the aerial image and extracting a two-dimensional (2D) coordinate value of the detected object; a space coordinate calculating unit calculating a three-dimensional (3D) coordinate value corresponding to the 2D coordinate value by projecting the extracted 2D coordinate value onto point cloud data that configures the MMS data; and an HD map generating unit generating an HD map showing a road area of the aerial image in three dimensions based on the calculated 3D coordinate value.

The object of the road area may include at least one of a lane marking, a road surface marking, and a polygon, and the aerial image analyzing unit may classify, when the object of the road area is detected from the aerial image, the detected object by object type.

The apparatus may further include: a road attribute information allocating unit allocating road attribute information to the road according to the detected object, wherein the road attribute information may include link information for electronically shaping the road and node information electronically shaping a predetermined point in the link.

The space coordinate calculating unit may calculate a height value corresponding to the 2D coordinate value by projecting the 2D coordinate value onto the point cloud data configuring the MMS data, and calculate a 3D coordinate value corresponding to the 2D coordinate value based on the calculated height value.

The space coordinate calculating unit may determine whether the calculated height value is an error by comparing the calculated height value with a surrounding height value and perform an error notification when the calculated height value is determined to be an error value.

The apparatus may further include: a road facility detecting unit detecting a road facility from a driving image configuring the MMS data, wherein the space coordinate calculating unit may extract a 3D coordinate value of the detected road facility from the point cloud data configuring the MMS data and the HD map generating unit may generate the HD map reflecting the road facility three-dimensionally based on the detected image of the road facility and the extracted 3D coordinate value of the road facility.

The apparatus may further include: an HD map processing unit calculating dummy information and performing data processing for optimizing the generated HD map data by assigning the calculated dummy information as an attribute of the object.

The dummy information may include an offset value corresponding to a distance difference from a reference lane marking and a relative height value corresponding to a height difference from the reference lane marking.

The apparatus may further include: an aerial image updating unit generating a top view image based on a driving image configuring the MMS data and updating the aerial image by arranging the generated top view image in chronological order on a position of the aerial image corresponding to an imaging position at which the driving image is captured, wherein the aerial image analyzing unit performs a method for producing an HD map using the updated aerial image.

According to another aspect of the present invention, there is provided a program stored in a computer-readable recording medium to perform the high-definition (HD) map producing method as described above.

According to another aspect of the present invention, there is provided a computer-readable recording medium storing a program for performing the high-definition (HD) map producing method as described above.

According to the various exemplary embodiments of the present invention described above, by automating producing of an HD map essential for HD positioning of an autonomous vehicle and/or a road guidance service for each lane using an aerial image and MMS data, cost for constructing and updating the HD map may be significantly lowered and efficiency of producing the HD map may be increased.

BRIEF DESCRIPTION OF DRAWINGS

FIG. 8 is a view showing a road facility according to an exemplary embodiment of the present invention.

FIGS. 10 and 11 are flowcharts illustrating a method for producing an HD map according to an exemplary embodiment of the present invention.

DETAILED DESCRIPTION

Figure 1:
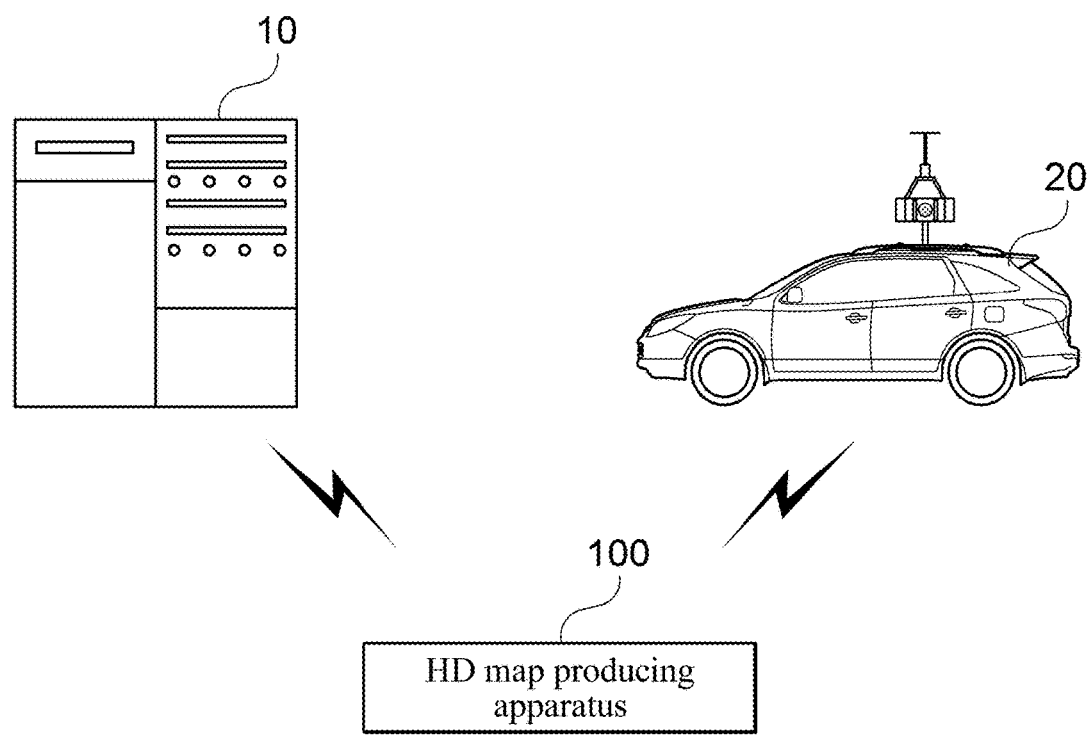
FIG. 1 is a conceptual diagram illustrating a system for producing a high-definition (HD) map according to an exemplary embodiment of the present invention.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore, it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may be tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

FIG. 1 is a conceptual diagram illustrating a system for providing a high-definition (HD) map according to an exemplary embodiment of the present invention. Referring to FIG. 1, a system 1000 for producing an HD map (or an HD map producing system 1000) may include an aerial image server 10, a mobile mapping system (MMS) 20, and an apparatus 100 for producing an HD map (or an HD map producing apparatus 100).

The aerial image server 10 is a server for storing and managing aerial images and may transmit the aerial images to the HD map producing apparatus 100 through wired/wireless communication.

Here, the aerial image refers to an image of a ground surface captured in the air using an airplane or a drone, and the aerial image may be an orthophotograph in which geometric distortion caused by topographic undulations such as a height difference or inclination is corrected. Such an aerial image may preferably be an image having a resolution of at least 6 cm/pixel.

In addition, the aerial image may be matched to imaging information including a location, time, and altitude at which the aerial image was captured, and specifications of an imaging camera.

The mobile mapping system 20 is a system which is installed in a vehicle by integrating various sensors implemented as global positioning system (GPS), an inertial measurement unit (IMU), a laser scanner, a camera, a 4D imaging radar, and the like and simultaneously acquires location information, images of roads and geographical features near the roads and various sensing information.

Specifically, the mobile mapping system 20 may include a location acquisition sensor that acquires a location of a road on which a vehicle drives through the GPS and a posture sensor that acquires a posture of the vehicle through an inertial measurement unit (IMU).

In addition, the mobile mapping system 20 may include a camera unit attached to the vehicle and imaging a road and a surrounding of the road, a distance measurement instrument (DMI), and the like. Here, the periphery of the road may include buildings, facilities, parked vehicles, and moving vehicles that are not related to the road.

In addition, the mobile mapping system 20 may include a light detection and ranging (LiDAR) sensor that is a kind of active remote sensing that acquires desired information without direct contact with an object using the same principle as a radar or a 4D imaging radar sensor. Here, the LiDAR sensor may be implemented as a laser scanner that acquires desired information by shooting a laser to a target whose information is to be acquired and detecting a time difference and a change in energy of electromagnetic waves reflected and returned from the target. The 4D imaging radar is a radar that detects an object in four dimensions of distance, height, depth, and speed and may provide a point cloud acquired through radio waves received after being reflected from the object as an image for object sensing.

The mobile mapping system 20 for a vehicle may store MMS data obtained by measuring a road and a surrounding of the road while the vehicle actually drove in the road in the storage unit. Here, the MMS data may include at least one of vehicle position data sensed using a satellite navigation device, vehicle posture data sensed using an inertial measurement device, images of the road and the surrounding of the road sensed using a camera unit, and point cloud data sensed using a laser scanner or a 4D imaging radar. Here, the point cloud data acquired by a laser scanner or the 4D imaging radar of the mobile mapping system for a vehicle may be a set of a large number of points having 3D space coordinates (i.e., x, y, z information of real world).

That is, the mobile mapping system 20 may acquire point cloud data having space coordinate values for the road on which the vehicle drives and the surrounding of the road by using the LiDAR sensor.

In addition, the mobile mapping system 20 may acquire a driving image of the road on which the vehicle is traveling and the surrounding of the road using the camera. Here, the acquired driving image may be an omnidirectional image having a radius of 360 degrees around the vehicle.

Meanwhile, the mobile mapping system 20 may generate MMS data by mapping a driving image according to imaging and point cloud data having a 3D space coordinate value. Here, an example of the mapping may be mapping pixels of the captured image and a 3D space coordinate value of the point cloud data.

The point cloud data and driving images acquired using the mobile mapping system 20 will be described in more detail with reference to FIGS. 2A and 2B.

Figure 2A:
FIGS. 2A-2B are diagrams illustrating point cloud data and a driving image acquired by a mobile mapping system according to an exemplary embodiment of the present invention.
Figure 2B:
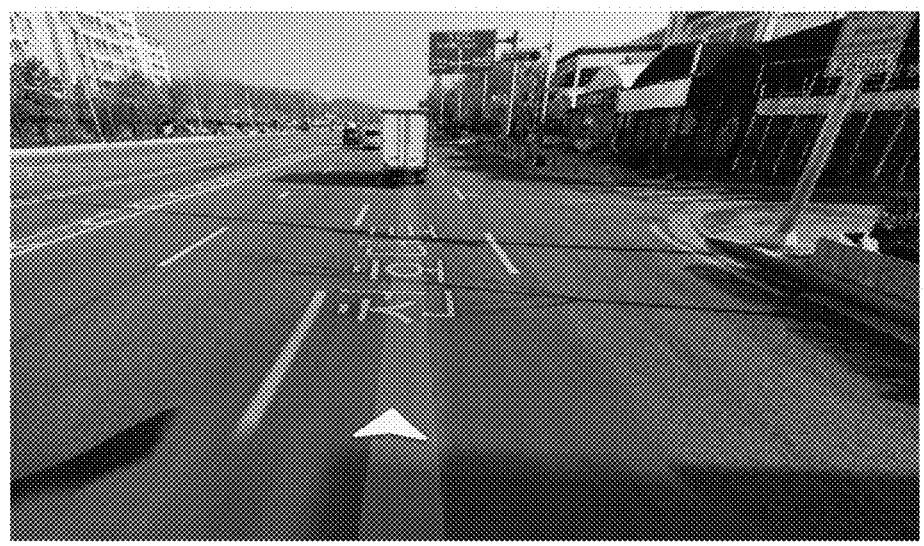

FIGS. 2A and 2B show an exemplary view showing point cloud data and a driving image acquired by a mobile mapping system according to an exemplary embodiment of the present invention. Referring to FIGS. 2A and 2B, the mobile mapping system 20 may shoot a laser to targets such as the road on which the vehicle is driving, a building near the road, a facility, or the like using a LIDAR sensor and perform scanning to acquire the point cloud data as shown in FIG. 2A. Here, the point cloud data may be a set of a large number of points having 3D space coordinate (i.e., x, y, z information of real world) as shown in FIG. 2A.

In addition, the mobile mapping system 20 may perform imaging using the camera during driving of the vehicle to acquire a driving image including the road on which the vehicle is driving, the building around the road, the facility, another vehicle, and the like as shown in FIG. 2B.

Meanwhile, the MMS data acquired by the mobile mapping system 20 may be transmitted to the HD map producing apparatus 100 through wired/wireless communication.

The HD map producing apparatus 100 may perform a function of producing an HD map essential for providing high-definition positioning of autonomous vehicles and/or a road guidance service for each lane based on aerial images, the point cloud data, and driving images Here, the HD map has an accuracy level of within 10 cm of an error range and may include a map containing information on lane marking information such as a road centerline or a boundary line, road surface information, and information on signs, curbs, road surface marks, and various structures in a 3D digital format.

Hereinafter, the HD map producing apparatus 100 according to an exemplary embodiment of the present invention will be described in detail with reference to the accompanying drawings.

Figure 3:
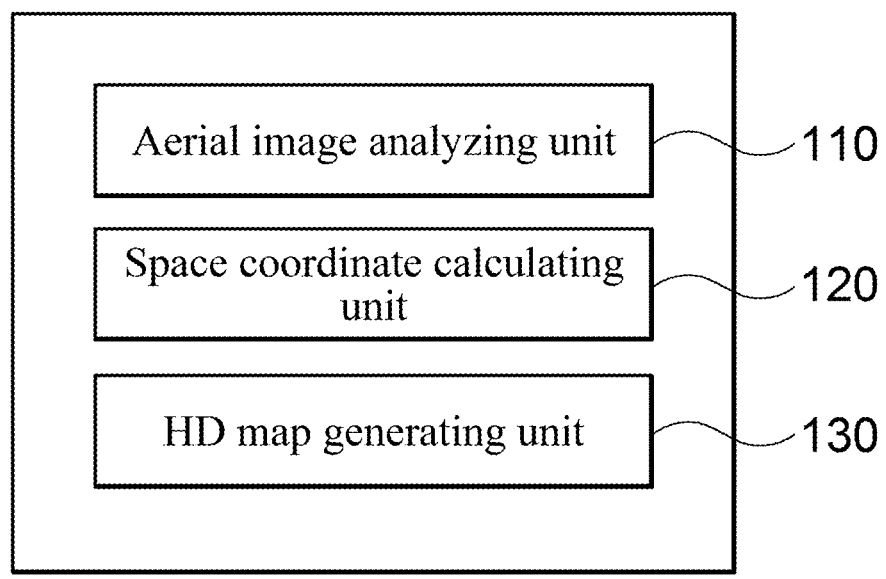
FIG. 3 is a block diagram illustrating an apparatus for producing an HD map according to an exemplary embodiment of the present invention.
Figure 4:
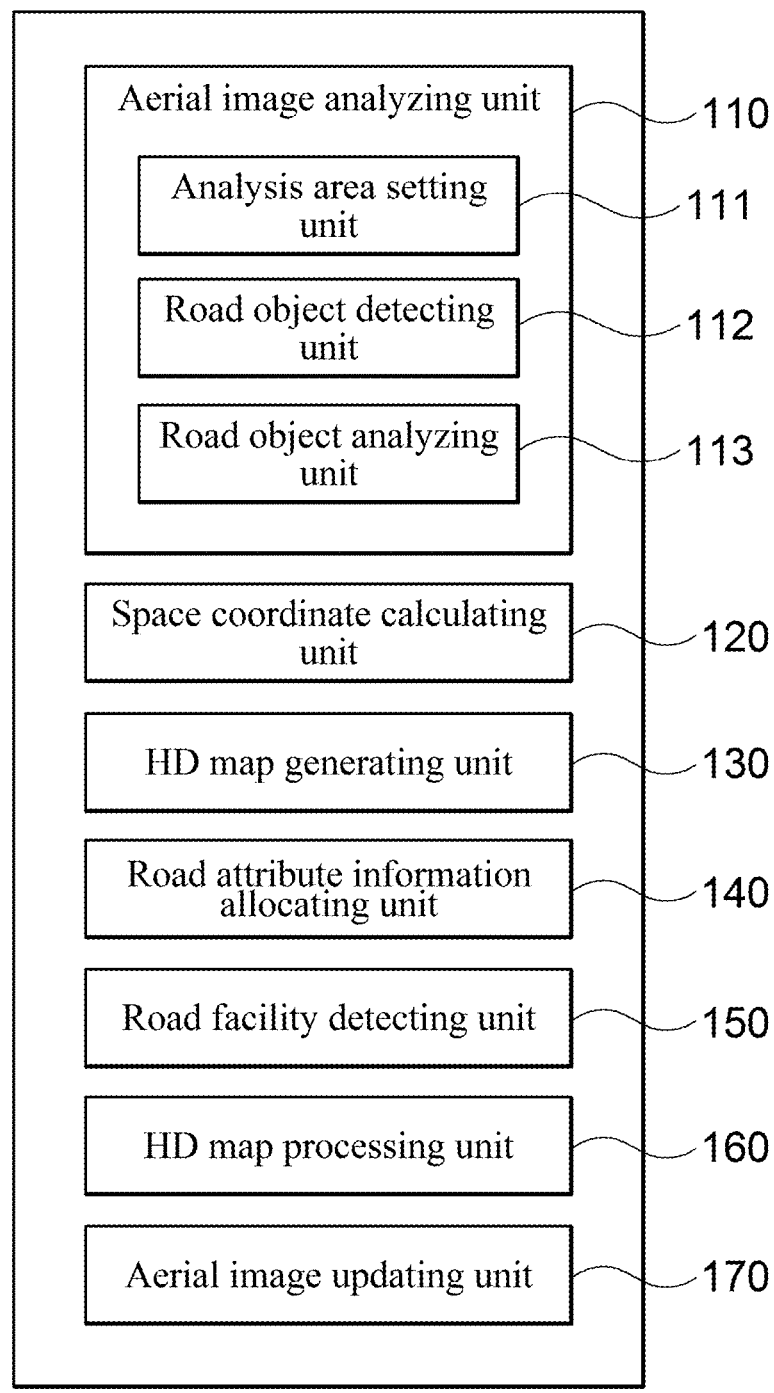
FIG. 4 is a specific block diagram illustrating an apparatus for producing an HD map according to an exemplary embodiment of the present invention.

FIG. 3 is a block diagram illustrating a configuration of an HD map producing apparatus according to an exemplary embodiment of the present invention. FIG. 4 is a block diagram specifically illustrating a configuration of an HD map producing apparatus according to an exemplary embodiment of the present invention.

Referring to FIG. 3, the HD map producing apparatus 100 according to an exemplary embodiment of the present invention may include all or some of the aerial image analyzing unit 110, the space coordinate calculating unit 120, and the HD map generating unit 130. In addition, referring to FIG. 4, the HD map producing apparatus 100 according to an exemplary embodiment of the present invention may include all or some a road attribute information allocating unit 140, a road facility detecting unit 150, an HD map processing unit 160, and an aerial image updating unit 170. In addition, the aerial image analyzing unit 110 may include all or some of an analysis area setting unit 111, a road object detecting unit 112, and a road object analyzing unit 113.

The HD map producing apparatus 100 according to the present invention may receive an aerial image from the aerial image server 10, receive MMS data from the mobile mapping system 20, and produce an HD map using the received aerial image and the received MMS data.

That is, the HD map essential for HD positioning of the autonomous vehicles and/or providing a road guidance service for each lane requires the following conditions.

[1] A lane marking for distinguishing the plurality of lanes, a lane center lane marking, a regulation lane marking, a road boundary, a road center lane marking, a traffic sign (location+attribute), a road surface marking (location+attribute)

[2] Error range (precision): plane ±0.25 m, vertical ±0.25 m

The HD map producing apparatus 100 according to the present invention may produce an HD map that satisfies the above requirements using aerial images and MMS data.

Here, the HD map producing apparatus 100 may be implemented using software, hardware, or a combination thereof. For example, as hardware implementation, the HD map producing apparatus 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electrical units for performing other functions.

The aerial image analyzing unit 110 may recognize and analyze an object through image processing of a plurality of features included in the aerial image. Specifically, the aerial image analyzing unit 110 may detect the object in the road area from the aerial image and extract a 2D coordinate value of the detected object from the aerial image. Here, the aerial image analyzing unit 110 may include all or some of the analysis area setting unit 111, the road object detecting unit 112, and the road object analyzing unit 113.

The analysis area setting unit 111 may perform a function of setting a predetermined area in which an aerial image is to be analyzed.

As an example, when the user selects an area to be analyzed among aerial images, the analysis area setting unit 111 may set the selected area as the predetermined area.

As another example, the analysis area setting unit 111 may select the predetermined area according to a selection condition previously input for analysis of an aerial image. Here, the selection condition may be a condition for dividing the aerial image into a predetermined number of images having the same size or a condition for dividing the aerial image by regions having similar pixel values.

Figure 5:
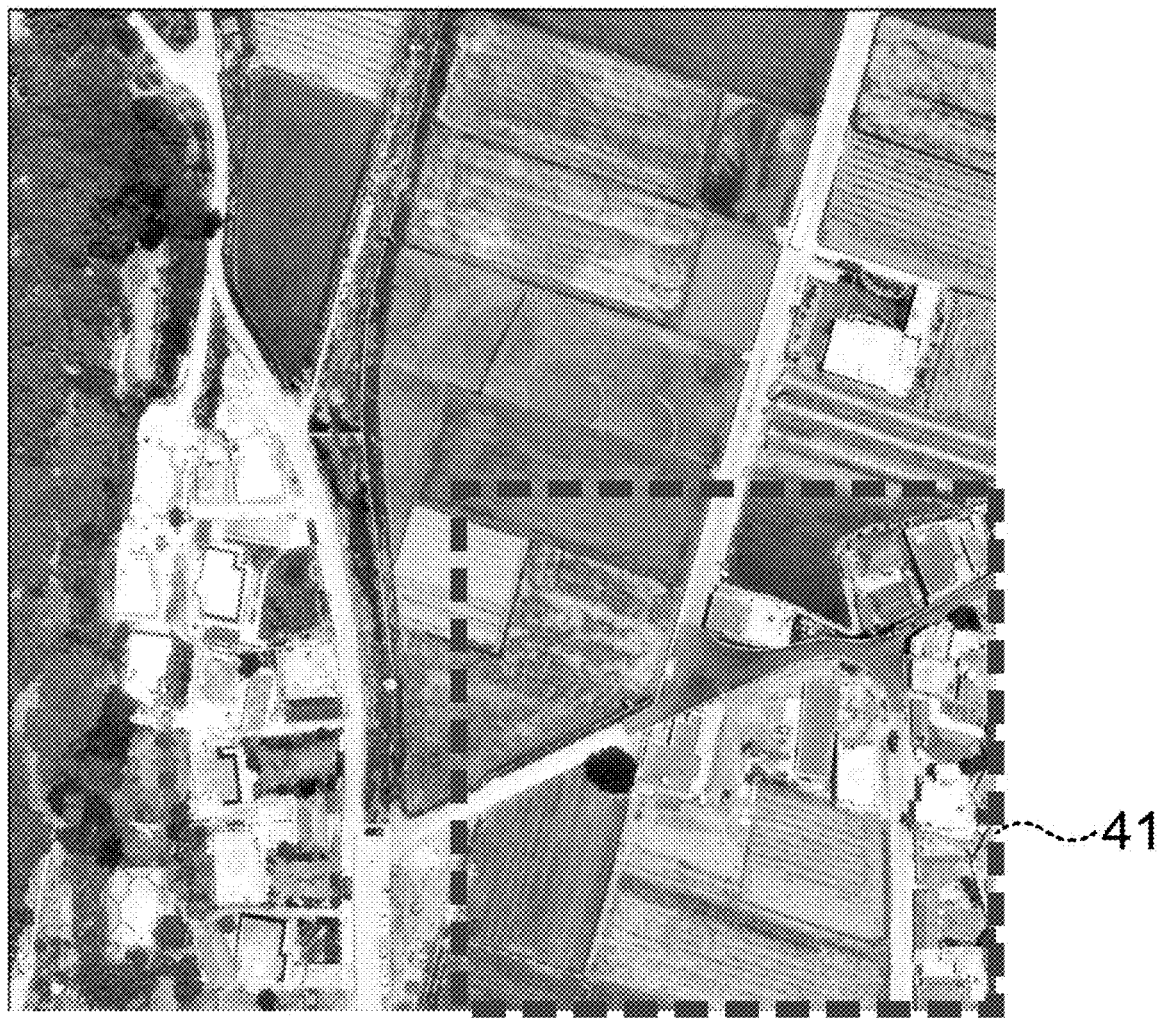
FIG. 5 is a diagram illustrating a process of setting an analysis area of an aerial image according to an exemplary embodiment of the present invention.

FIG. 5 is an exemplary view showing a process of setting an analysis area of an aerial image according to an exemplary embodiment of the present invention. Referring to FIG. 5, the analysis area setting unit 111 may select a predetermined area 41 from the aerial image based on the previously input selection condition or a user selection. The selected area 41 may be analyzed by the road object detecting unit 112 and the road object analyzing unit 113.

The road object detecting unit 112 may detect an object in a road area from the aerial image. Specifically, the road object detecting unit 112 may detect a road area in a predetermined area of the aerial image set by the analysis area setting unit 111. In addition, the road object detecting unit 112 may detect an object in the detected road area.

Here, the object of the road area may include at least one of a lane marking, a road surface marking, and a polygon. For example, the road object detecting unit 112 may detect a lane marking through linear line segment extraction and may detect a road surface marking and a polygon through pattern recognition.

In addition, the road object analyzing unit 113 may generate various data by analyzing the object in the road area. Specifically, the road object analyzing unit 113 may analyze a lane marking to determine a type of the lane marking and extract a 2D coordinate value of the lane marking from the aerial image. In addition, the road object analyzing unit 113 may analyze a road surface marking to determine a type and an attribute of the road surface marking, and extract a 2D coordinate value of the road surface marking from the aerial image. In addition, the road object analyzing unit 113 may analyze a polygon to determine a type of the polygon, and extract a 2D coordinate value of the polygon from the aerial image. This will be described in more detail with reference to FIGS. 6A-6C.

Figure 6A:
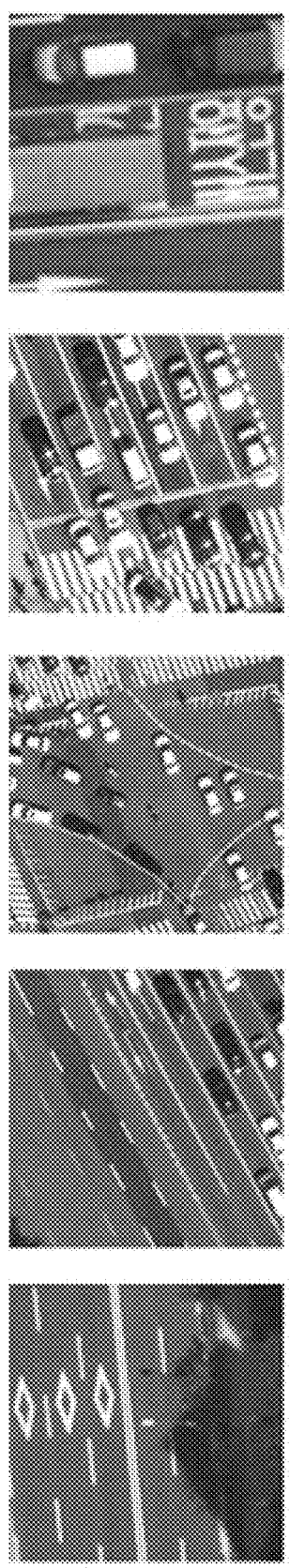
FIGS. 6A-6C are diagrams illustrating an object in a road area according to an exemplary embodiment of the present invention.
Figure 6B:
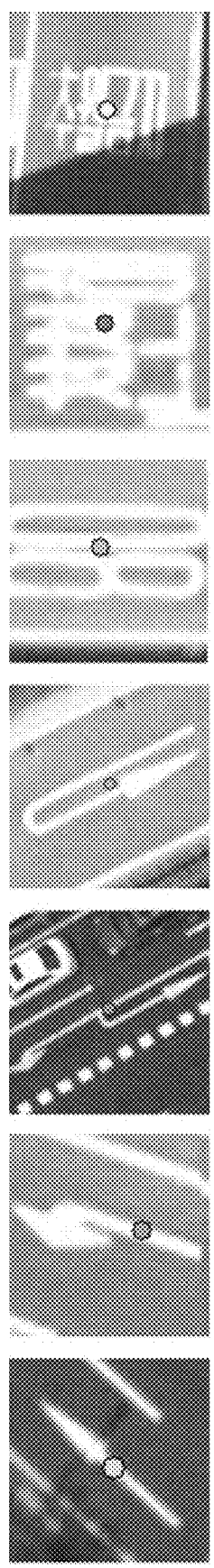
Figure 6C:
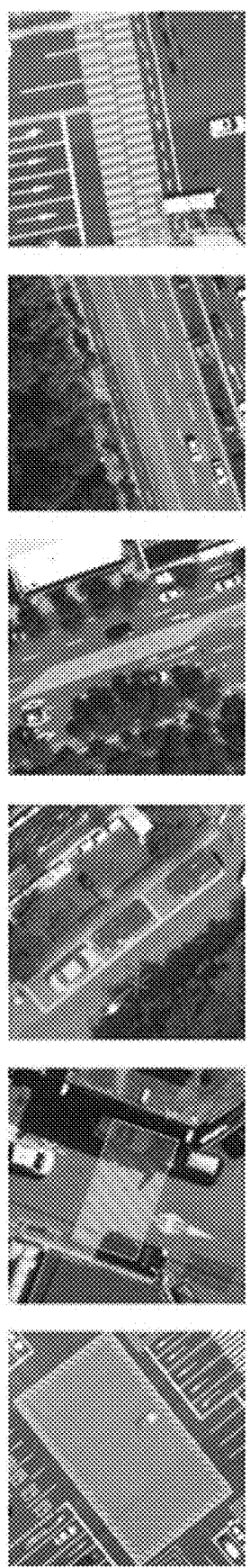

FIGS. 6A-6C show an exemplary view showing an object in a road area according to an exemplary embodiment of the present invention. Referring to FIG. 6A, the type of lane marking may vary, such as lane marking for distinguishing the plurality of lanes, a road center lane marking, a regulation lane marking, a bus-only lane marking, and the like, and the road object analyzing unit 113 may analyze the lane marking to determine the type of the lane marking.

Further, referring to FIG. 6B, the road surface marking may refer to lines, letters, symbols, and the like indicated on the road surface for traffic regulation or guidance to a vehicle or a pedestrian as shown in FIG. 6B and may vary such as a road sign indicating a moving direction of vehicle, a road sign indicating a regulated speed, a road sign indicating a caution phrase, and so on. In this case, the road object analyzing unit 113 may analyze the road surface marking to determine a type and an attribute of the road surface mark. Here, the attribute of the road surface marking may refer to a direction information in case of a road surface marking indicating a vehicle moving direction, and refer to an attribute information such as speed limit information in case of a road surface marking indicating a regulation speed.

Further, referring to FIG. 6C, a polygon, as a minimum unit configuring a 3D figure in computer graphics, refers to an area that may be designated as a polygon in a road area. For example, as shown in FIG. 6C, the polygon may include a parking area, a road medium strip, a crosswalk, a speed bump, a safety zone, and the like. In this case, the road object analyzing unit 113 may analyze the polygon to determine a type of the polygon.

Meanwhile, the object of the road area may further include dangerous facilities such as power transmission facilities and sandboxes located on the sidewalk next to the road, and the road object detecting unit 112 may further detect dangerous facilities of the road area from the aerial image.

Meanwhile, when an object in the road area is detected from the aerial image, the road object analyzing unit 113 may classify the detected object according to the object type to be determined.

Meanwhile, when the aerial image analysis is completed by the aerial image analyzing unit 110, the road attribute information allocating unit 140 may allocate road attribute information to the road based on the detected object. Here, the road attribute information may include link information for electronically shaping a road and node information for electronically shaping a predetermined point within a link.

That is, the map data may include a plurality of links and a plurality of nodes that electronically shape the real world. According to the present invention, the road attribute information allocating unit 140 may assign a road attribute to an object detected from the aerial image.

A road may include a plurality of lanes and lane markings that distinguish the plurality of lanes, and according to the present invention, link information may be assigned to each of a plurality of lanes and each of a plurality of roads.

Here, the link information may include a link identifier (link ID), link location information, link progress direction information, link attribute information, road width information corresponding to a link, lane marking number information of road corresponding to the link, type information of a road corresponding to the link, guidance code information, and the like. The link location information may be information indicating a 2D coordinate value of the link, such as latitude and longitude of the link. The link attribute information may refer to information indicating whether the link is a bidirectional link or a unidirectional link. Here, the bidirectional link may refer to a link that defines a left road and a right road as one link based on bi-directions that is, a road centerline.

The type information of the road corresponding to the link may be information indicating a type of the road, such as a highway, an urban expressway, a national road, a local road, and a general road. The guide code information may be information for guiding a specific point on a road corresponding to a link, such as a speed limit or a control point.

In addition, the node information may include a node identifier (node ID), node location information, node attribute information, and the like.

As an example, the road attribute information allocating unit 140 may allocate road attribute information to the road area analyzed by the aerial image analyzing unit 110 as shown in Table 1 below.

TABLE 1

| Road link ID | Lane link ID(Identifier) | Moving direction information of lane link |
|---|---|---|
| S0001 | I01 | Go straight |
|  | I02 | Go straight |
|  | I03 | Go straight and turn right |
| S0002 | I01 | Turn left |
|  | I02 | Go straight |
|  | I03 | Go straight |
|  | I04 | Turn right |

Meanwhile, the space coordinate calculating unit 120 may calculate a 3D coordinate value corresponding to a 2D coordinate value by projecting the 2D coordinate value for the road area extracted by the aerial image analyzing unit 110 onto the point cloud data configuring the MMS data.

Specifically, if there is no MMS data including the 2D coordinate value extracted from the aerial image analyzing unit 110 or MMS data including a 2D coordinate value among previously generated MMS data, the space coordinate calculating unit 120 may detect MMS data including a proximity position of the extracted 2D coordinate value. Also, the space coordinate calculating unit 120 may calculate a height value corresponding to the 2D coordinate value of an object such as a lane, a road surface marking, and a polygon of the road area based on the point cloud data of the detected MMS data. Here, a 2D coordinate value without a corresponding height value may be determined as a height value corresponding to an adjacent 2D coordinate value.

In addition, the space coordinate calculating unit 120 may calculate a 3D coordinate value corresponding to the 2D coordinate value of the object such as a lane, a road surface marking, a polygon, and the like based on the calculated height value.

As an example, the height value of the lane calculated by the space coordinate calculating unit 120 may have a shape corresponding to a gradient of the lane in a vertical direction and a gradient of the lane in a horizontal direction.

Meanwhile, the HD map generating unit 130 may generate an HD map representing a road area of an aerial image in three dimensions based on a 3D coordinate value calculated by the space coordinate calculating unit 120.

The operation of the space coordinate calculating unit 120 and the HD map generating unit 130 according to the present invention will be described in more detail with reference to FIGS. 7A-7C.

Figure 7A:
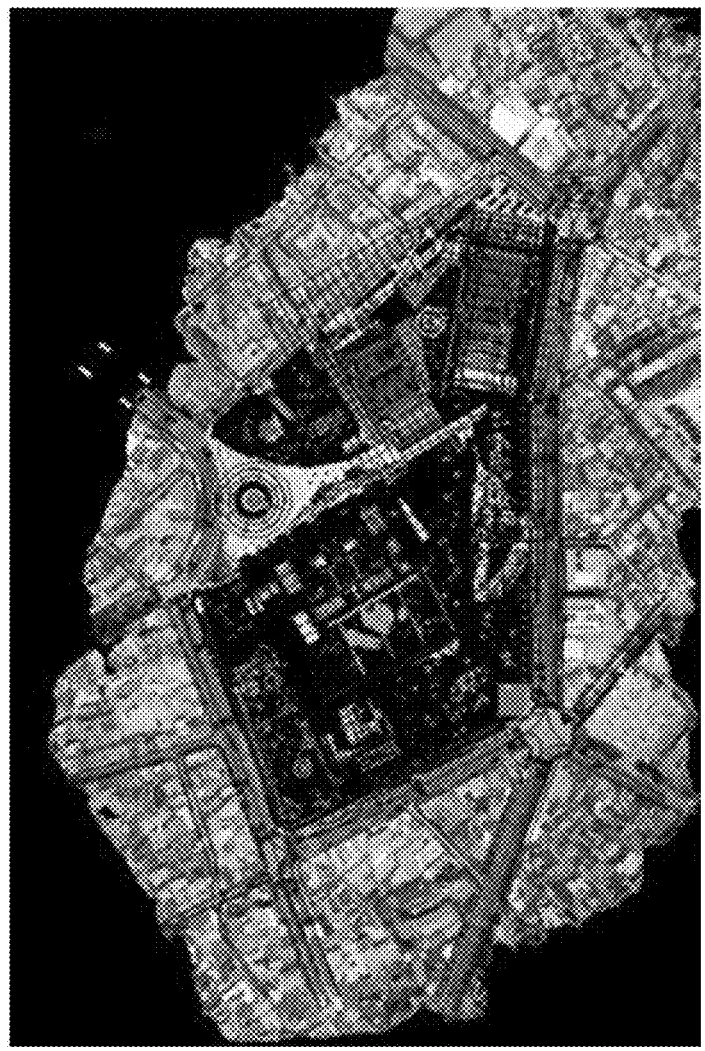
FIGS. 7A-7C are diagrams illustrating a process of generating an HD map according to an exemplary embodiment of the present invention.
Figure 7B:
Figure 7C:
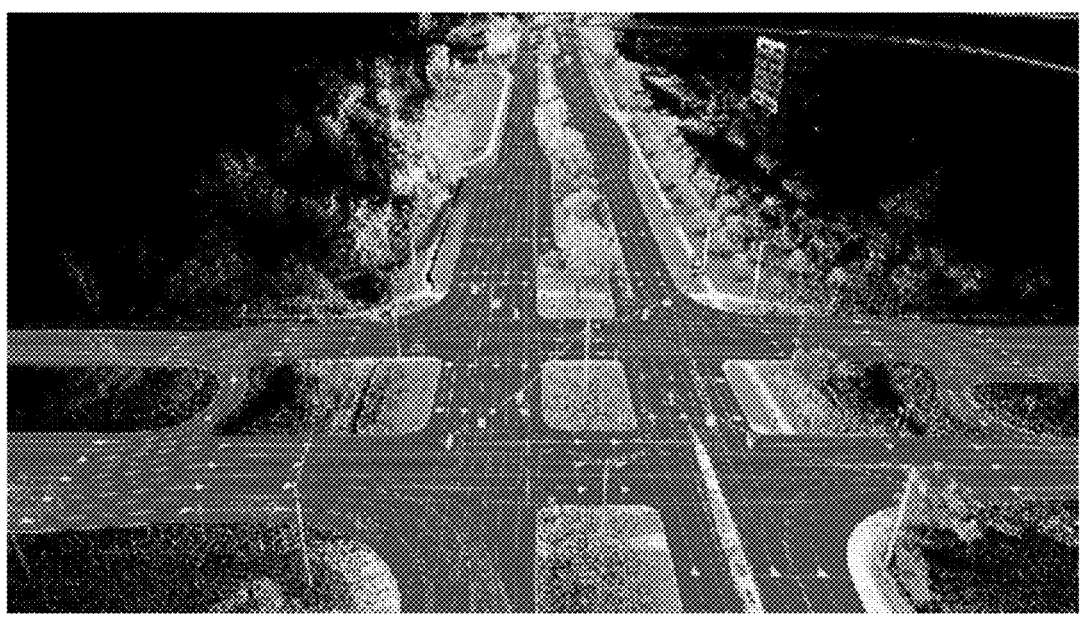

FIGS. 7A-7C show an exemplary view showing an HD map generation process according to an exemplary embodiment of the present invention. FIG. 7A shows an aerial image from which 2D coordinate values for objects in a road area are extracted, and FIG. 7B shows point cloud data of MMS data having the 2D coordinate values of FIG. 7A. That is, according to the present invention, height values corresponding to the 2D coordinate values are calculated by projecting the 2D coordinate values for the objects onto the point cloud data illustrated in FIG. 7B, and 3D coordinate values corresponding to the 2D coordinate values of the objects in the road area may be calculated based on the calculated height values.

Meanwhile, the HD map generating unit 130 may generate an HD map showing a road area of an aerial image shown in FIG. 7C in three dimensions based on the 3D coordinate value calculated by the space coordinate calculating unit 120.

Meanwhile, the space coordinate calculating unit 120 may determine whether the calculated height value is an error by comparing the calculated height value with a surrounding height value. Specifically, the space coordinate calculating unit 120 may calculate a difference between the calculated height value and the surrounding height value, and when the calculated difference is greater than or equal to a predetermined value, the space coordinate calculating unit 120 may determine that the calculated height value is an error. In this way, when the calculated height value is determined as an error value, the space coordinate calculating unit 120 may perform an error notification indicating that the calculated height value is an error. Here, the error notification may be performed through a voice or a screen display method.

Meanwhile, according to another exemplary embodiment of the present invention, the space coordinate calculating unit 120 may calculate a 3D coordinate value for only lanes and provide data only with a 2D coordinate value without calculating a 3D coordinate value for a polygon and a road surface marking.

In this case, the polygon and the road surface marking have only 2D coordinate values, and the space coordinate calculating unit 120 may calculate the height of the corresponding position of the polygon and the road surface marking based on the calculated height value for the lane in real time. In this case, there is an advantage in that the amount of data may be reduced and the final data may be separately extracted in a form independent from the height value of the lane, but there is a disadvantage that calculation in the terminal is increased.

However, when the space coordinate calculating unit 120 calculates a 3D coordinate value for all of the lane, polygon, and road surface marking, the amount of data may increase and the height value must always be with the lane information. However, there is an advantage of reducing operations in a terminal.

Accordingly, according to the present invention, if the information is vast, the polygon and the road surface marking may provide data only with 2D coordinates in the former method, and if the amount of information is small, data may be provided as 3D coordinates to all of the lane, polygon, and the road surface marking in the latter method.

Figure 8:
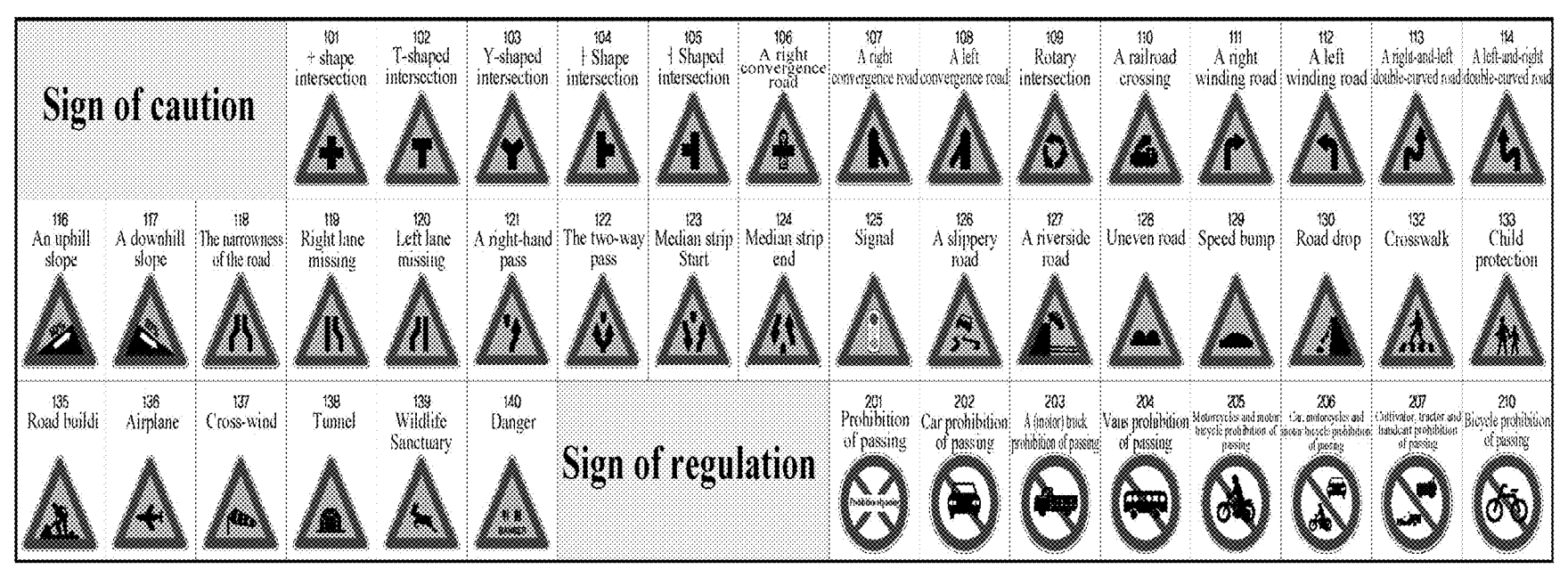

Meanwhile, the road facility detecting unit 150 may detect a road facility from a driving image configuring MMS data. Specifically, if there is no MMS data including a 2D coordinate value extracted by the aerial image analyzing unit 110 or there is no MMS data including a 2D coordinate value among the previously generated MMS data, the road facility detecting unit 150 may detect MMS data including a proximity position of the extracted 2D coordinate value. Also, the road facility detecting unit 150 may detect a road facility from the driving image of the detected MMS data. Here, the road facility may include a traffic sign located on the road as shown in FIG. 8. However, the present invention is not limited thereto, and the road facility may further include various dangerous facilities such as buildings, trees, traffic lights, speed limit cameras, power substations located on a sidewalk next to the road, a sandbox, and the like.

In this case, the space coordinate calculating unit 120 may extract a 3D coordinate value of the detected road facility from point cloud data configuring MMS data.

In this case, the HD map generating unit 130 may generate an HD map reflecting the road facility in three dimensions based on the image of the road facility detected by the road facility detecting unit 150 and the 3D coordinate value of the extracted road facility. Specifically, the HD map generating unit 130 may generate an HD map representing a road area of an aerial image in three dimensions and showing a road facility in three dimensions at the same time.

Meanwhile, the HD map processing unit 160 may perform a data processing process of processing the generated HD map data into the most optimal data. Specifically, the HD map processing unit 160 may perform data processing for optimizing the data of the generated HD map by calculating dummy information and assigning the calculated dummy information as an attribute of an object. Here, the dummy information is information generated based on geometric information that is a reference as an additional attribute to reduce the amount of information, not the form of actual data. Detail information of each information other than common attribute information may be referred to as dummy information.

As for a lane, data processing may be performed by calculating an offset value and a relative height value between a reference lane and a corresponding lane and assigning the calculated values to a lane area of the HD map. Here, an example of the reference lane may be a center lane.

That is, a form having all information on a lane as a 3D coordinate value may generate a very large load when calculating driving using an HD map. According to the present invention, the offset value which is a difference from the reference lane to the corresponding lane and the relative height value which is a height difference value from the reference lane to the corresponding lane may be calculated and assigned as attributes to the lane area of the HD map, whereby the amount of calculation may be expected to be reduced by tracking calculation. In addition, the HD map processing unit 160 may also assign attributes such as a type of the lane, a thickness of the lane, and the like, to the lane.

In addition, as for the polygon and the road surface marking, the HD map processing unit 160 may calculate an offset value and a relative height value between the reference lane and the corresponding polygon or road surface marking and assign the calculated values as attributes of the polygon and road surface marking on the HD map, thereby performing data processing. In addition, the HD map processing unit 160 may also assign attributes such as a reference and direction of a road surface marking, and a polygon type (e.g., a crosswalk, a median strip, a parking space, etc.).

As described above, according to the present invention, since data is formed with the offset value and the relative height value based on the reference lane, the size of the final service data may be significantly reduced.

Meanwhile, according to the present invention, the calculated dummy information may be assigned to the link attribute information, and accordingly, an HD level map service may be provided through the link attribute information and the dummy information.

That is, according to the present invention, it is possible to assign the optimal data most suitable for the HD map as an attribute through additional processing of the HD map.

Meanwhile, aerial images are updated at an update period of at least 1 to 2 years, so it may be difficult to reflect the latest data, but the HD map must have a short update period (i.e., needs to be updated frequently) due to its characteristics.

Therefore, according to the present invention, the aerial image updating unit 170 may generate a top view image based on a driving image configuring MMS data and update the aerial image based on the generated top view image. Herein, the case where the driving image is an image included in the MMS data has been described as an example, but the present invention is not limited thereto, and according to another implementation example, the driving image may be an image to be captured through a general camera installed in a vehicle such as an image recording device for a vehicle.

Specifically, the aerial image updating unit 170 may convert a driving image of MMS data into a virtual top view image such as an around view monitor. In addition, the aerial image updating unit 170 may detect imaging location information (e.g., 2D coordinate values) and imaging time information of the generated top view image. In addition, the aerial image updating unit 170 may update the aerial image by arranging the top view image at a position of an aerial image corresponding to an imaging position at which the driving image was captured in chronological order. In this case, the aerial image updating unit 170 may perform an update by arranging the top view image on an upper layer as the imaging time is more recent.

In addition, when updating the aerial image based on the top view image, the aerial image updating unit 170 may determine an error between the two images through comparison of pixel values between the top view image and the aerial image and may perform updating only when a determined error value exceeds a preset error value.

The method for producing an HD map according to the present invention described above may be performed using the aerial image updated in real time.

Meanwhile, the aerial image updating unit 170 according to the present invention will be described in more detail with reference to FIGS. 9A-9C.

Figure 9A:
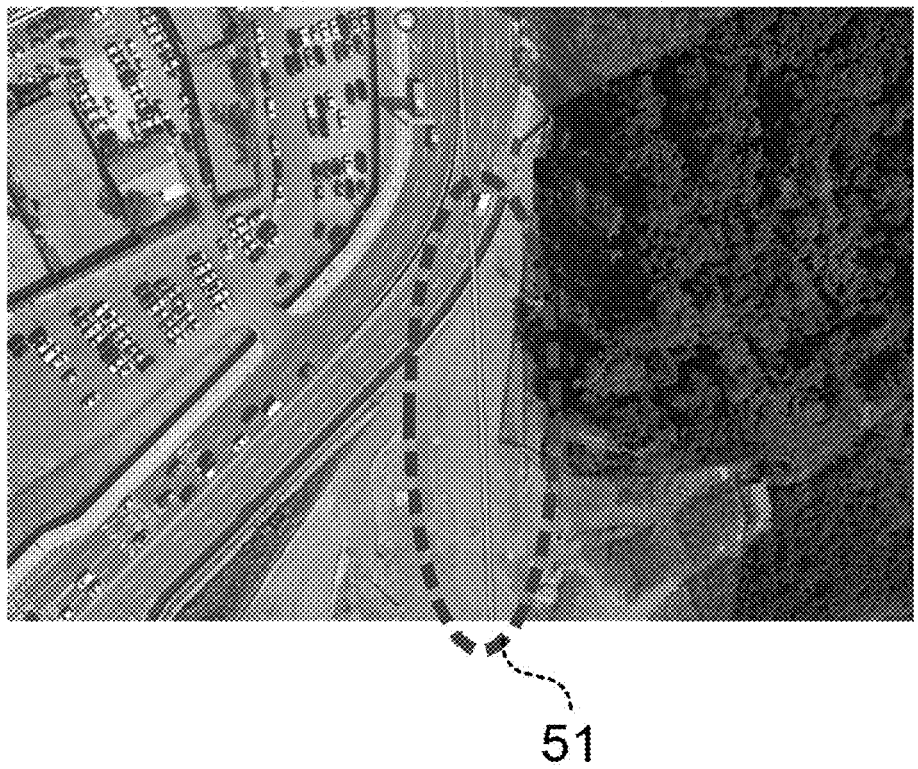
FIGS. 9A-9C are diagrams illustrating a process of updating an aerial image according to an exemplary embodiment of the present invention.
Figure 9B:
Figure 9C:
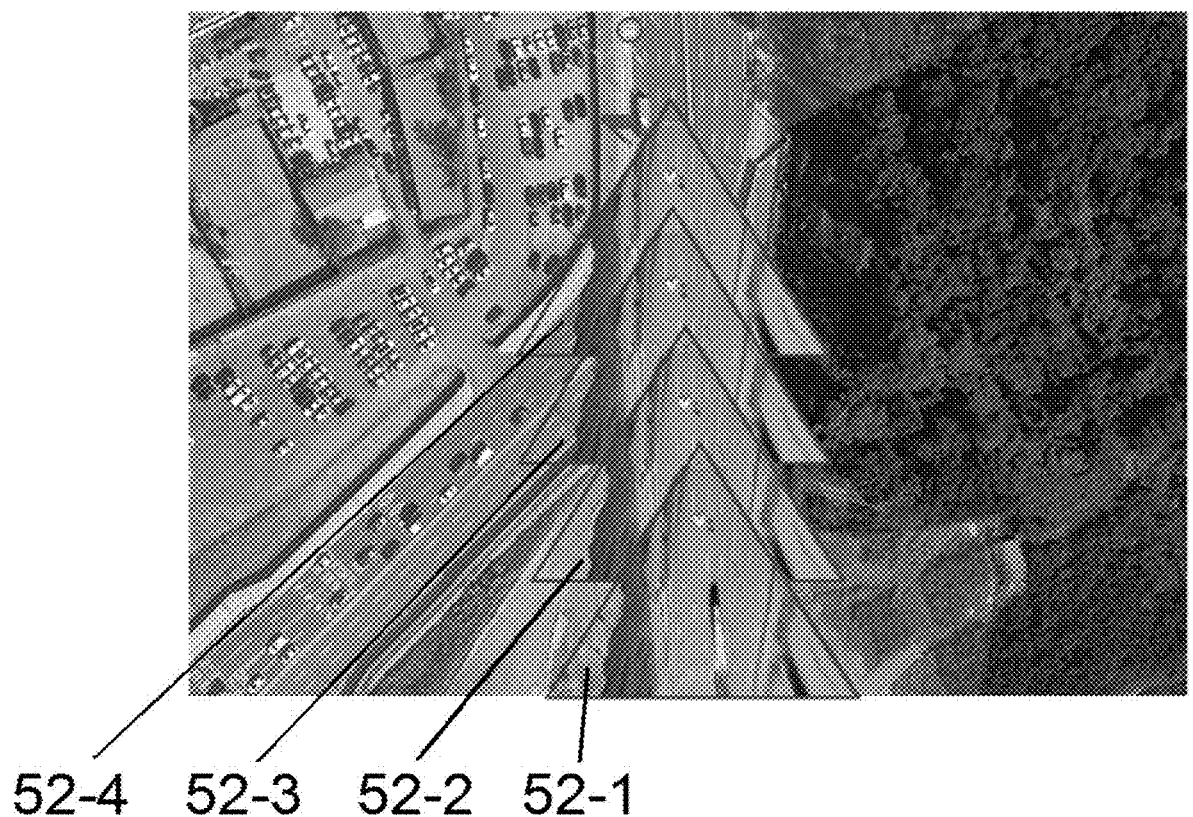

FIGS. 9A-9C show a diagram illustrating an aerial image updating process according to an exemplary embodiment of the present invention. FIG. 9A is a diagram illustrating an aerial image captured at a first point in time, and a road may be constructed in a specific area 51 according to road construction after the first point in time. However, since aerial images are updated at an update period of at least 1 to 2 years, it may be difficult to quickly reflect the matters on the road construction.

Therefore, according to the present invention, the aerial image updating unit 170 may obtain a driving image (FIG. 9B) of MMS data acquired through the mobile mapping system and convert the obtained driving image into a top view image.

Also, as shown in FIG. 9C, the aerial image updating unit 170 may update the aerial image by arranging top view images 52-1, 52-2, 52-3, and 52-4 at the position of the aerial image corresponding to the position where the driving image was captured in chronological order. In this case, the aerial image updating unit 170 may perform updating by arranging the top view image on an upper layer as the imaging time is more recent.

According to the present invention, by updating using the image acquired during driving in which the imaging period is shorter than that of the aerial image whose imaging period is longer, it is possible to quickly reflect the correction of the road.

Hereinafter, a method of producing an HD map according to an exemplary embodiment of the present invention will be described in detail with reference to FIGS. 10 to 11.

FIG. 10 is a flowchart showing a method of producing an HD map according to an exemplary embodiment of the present invention. Referring to FIG. 10, first, the HD map producing apparatus 100 may detect an object in a road area from an aerial image (S110). Here, the object of the road area may include at least one of a lane, a road surface marking, and a polygon, and the detecting (S110) may include classifying, when the object in the road area is detected from the aerial image, the detected object by object type. In addition, the object in the road area may further include dangerous facilities such as power substation facilities, sandboxes, and the like located on a sidewalk next to the road.

In addition, the HD map producing apparatus 100 may extract a 2D coordinate value of the object detected from the aerial image (S120).

In addition, the HD map producing apparatus 100 may calculate a 3D coordinate value corresponding to the 2D coordinate value by projecting the extracted 2D coordinate value onto point cloud data configuring MMS data (S130). Here, the calculating of the 3D coordinate value (S130) may include calculating a height value corresponding to the 2D coordinate value by projecting the detected 2D coordinate value onto the point cloud data configuring the MMS data and calculating the 3D coordinate value corresponding to the 2D coordinate value based on the calculated height value.

In addition, the HD map producing apparatus 100 may generate an HD map showing the road area of the aerial image in three dimensions based on the calculated 3D coordinate value (S140).

Meanwhile, the method for producing an HD map according to an exemplary embodiment of the present invention may further include allocating road attribute information to the road according to the detected object, wherein the road attribute information may include link information electronically shaping roads and node information electronically shaping a predetermined point in the link.

In addition, the method for producing an HD map according to an exemplary embodiment of the present invention described above may further include determining whether the calculated height value is an error by comparing the calculated height value with a surrounding height value and performing error notification when the calculated height value is determined as an error value.

In addition, the method for producing an HD map according to an exemplary embodiment of the present invention may further include processing the HD map by allocating attribute information for each object type to the generated HD map. Here, in the processing, for a lane, offset information and a height value for each lane based on a center line, a type of the lane, and a thickness of the lane may be allocated as the attributes. In addition, for a polygon and a road surface marking, offset information and a height value for each lane based on the center line, reference and direction of road surface marking, and a polygon type (e.g., a crosswalk, a median strip, a parking space, etc.) may be assigned as the attributes.

In addition, the method for producing an HD map according to an exemplary embodiment of the present invention described above may further include detecting a road facility from a driving image configuring MMS data and extracting a 3D coordinate value of the road facility detected from the point cloud data configuring the MMS data. In this case, in the generating of the HD map (S140), an HD map reflecting the road facility in three dimensions may be generated based on the image of the detected road facility and the extracted 3D coordinate value of the road facility. In other words, it is possible to generate an HD map in which both the road area and road facilities are reflected in three dimensions.

FIG. 11 is a flowchart illustrating a method for updating an aerial image according to an exemplary embodiment of the present invention. Referring to FIG. 11, first, the HD map producing apparatus 100 may generate a top view image based on a driving image configuring MMS data (S210). In addition, the HD map producing apparatus 100 may update the aerial image by arranging the top-view image at a position of the aerial image corresponding to an imaging position at which the driving image was captured in chronological order (S220).

Further, the HD map producing apparatus 100 may perform a subsequent HD map producing method using the updated aerial image.

Hereinafter, another exemplary embodiment of the present invention will be described in more detail with reference to FIGS. 12 to 13.

Figure 12:
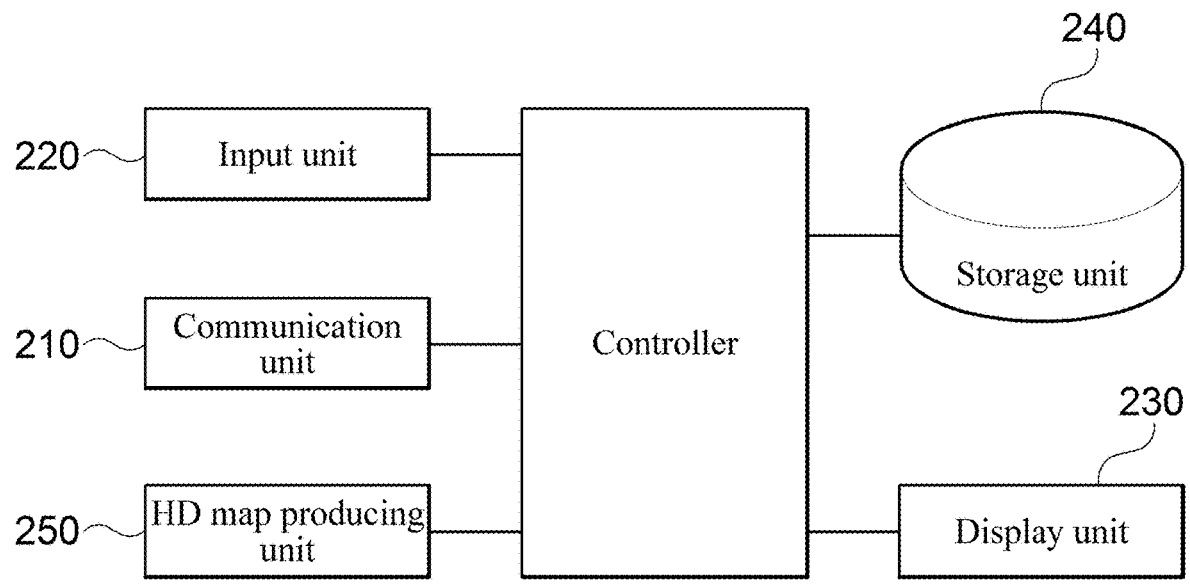
FIG. 12 is a block diagram illustrating a user terminal device for producing an HD map according to an exemplary embodiment of the present invention.

FIG. 12 is a block diagram illustrating a user terminal device for producing an HD map according to an exemplary embodiment of the present invention. Referring to FIG. 12, a method for producing an HD map according to an exemplary embodiment of the present invention may be implemented as a software tool and mounted in the user terminal device 200. Accordingly, the user terminal device 200 according to the present invention may produce an HD map based on a user's input value for map production.

Here, an HD map producing unit 250 may perform the same function as the HD map producing apparatus 100 described above.

In addition, a communication unit 210 may perform a function of transmitting and receiving various data by communicating with the aerial image server 10 and the mobile mapping system 20. In particular, the communication unit 210 may receive an aerial image from the aerial image server 10 and may receive MMS data from the mobile mapping system 20. Here, the communication unit 210 may be implemented using various communication methods such as a type connected in a wireless or wired manner through a local area network (LAN) and the Internet, a type connected through a universal serial bus (USB) port, a type connected through a mobile communication network such as 3G or 4G, or a type connected through a short-range communication method such as near field communication, radio frequency identification (RFID), and Wi-Fi.

An input unit 220 may receive various input values for producing an HD map from a user. For example, the input unit 220 may receive a user input for selecting a predetermined area to be analyzed in the aerial image from the user. As another example, the input unit 220 may receive a user input for inputting link information or node information.

Here, the input unit 220 may receive a user input such as a touch, a push operation, and the like and may be implemented using at least one of various button types, a touch sensor receiving a touch input, and a proximity sensor receiving an approaching motion. In addition, the input unit 220 may receive a user's voice.

In addition, a display unit 230 may display various screens for producing an HD map. As an example, if a height value calculated during an operation of calculating a space coordinate of the HD map producing apparatus 250 is determined to be an error, the display unit 230 may display an error notification indicating that the calculated height value is an error.

Meanwhile, a storage unit 240 may store the HD map produced by the HD map producing apparatus 200. Here, the storage unit 240 may be implemented as an internal storage device such as a random access memory (RAM), a flash memory, a read-only memory (ROM), an erasable programmable ROM (EPROM), an electronically erasable and programmable ROM (EEPROM), a register, a hard disk, a removable disk, a memory card, and the like or a detachable storage device such as a USB memory.

Figure 13:
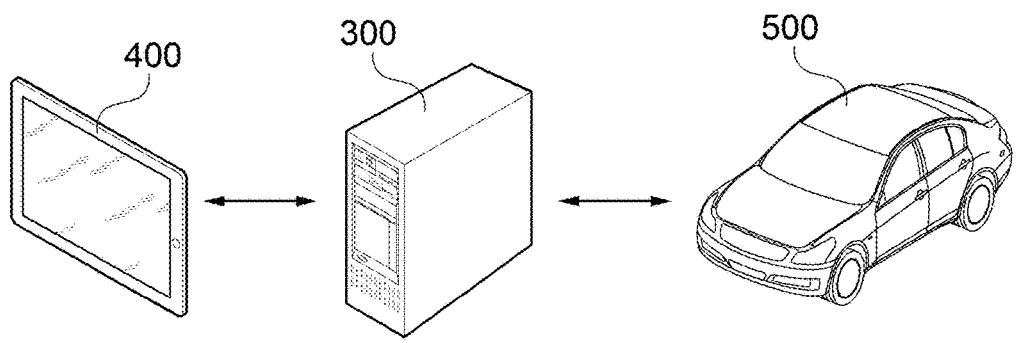
FIG. 13 is a block diagram illustrating a system for providing a location-based service using an HD map according to an exemplary embodiment of the present invention.

FIG. 13 is a block diagram illustrating a system for providing a location-based service using an HD map according to an exemplary embodiment of the present invention. Referring to FIG. 13, a location-based service providing system 2000 may include an HD map server 300, a navigation terminal device 400, and an autonomous vehicle 500.

Here, the HD map server 300 may automatically produce an HD map in real time by performing the function of the HD map producing apparatus 100 described above, and construct the produced HD map as a database (DB).

In this case, the navigation terminal device 400 may access the HD map server 300 to receive the HD map in real time. In addition, the navigation terminal device 400 may perform route guidance for each lane in consideration of a lane in which a vehicle is located using the provided HD map. In addition, although it is shown that the navigation terminal device 400 and the autonomous vehicle 500 are separated in FIG. 13, this is only an example, and the navigation terminal device 400 may be implemented in a form embedded in the autonomous vehicle 500.

In addition, the autonomous vehicle 500 may be provided with the HD map by accessing the HD map server 300. In addition, the autonomous vehicle 500 may accurately determine a lane in which the vehicle is located among a plurality of lanes configuring a road using the provided HD map, and perform autonomous driving.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. The terms used as such will be understood by the exemplary embodiments of the invention described herein. Likewise, in the case in which it is described herein that a method includes a series of steps, a sequence of the steps suggested herein is not necessarily a sequence in which the steps may be executed, and any described step may be omitted and/or any other steps that are not described herein may be added to the method.

In addition, in the specification and the claims, terms such as "left", "right", "front", "rear", "top", "bottom", "over", "under", and the like do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. The term "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the presence of phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present specification are used only in order to simplify the specification. Therefore, these terms do not have meanings or roles that distinguish from each other in themselves.

In addition, the terms used in the present specification are for explaining exemplary embodiments rather than limiting the present invention. The singular expression used in the present specification includes the plural expression unless the context clearly indicates otherwise. In the specification, it is to be noted that the terms "comprising" or "including", and the like, are not be construed as necessarily including several components or several steps described in the specification and some of the above components or steps may not be included or additional components or steps are construed as being further included.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the method according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. A method for producing a high-definition (HD) map by one or more processors using an aerial image and mobile mapping system (MMS) data of a mobile mapping system, the method comprising:

detecting an object of a road area and at least one second object of the road area from the aerial image, wherein the object of the road area is a lane marking and the at least one second object is at least one of a road surface marking and a polygon;

extracting a two-dimensional (2D) coordinate value of the detected object from the aerial image;

calculating a height value corresponding to the 2D coordinate value by projecting the extracted 2D coordinate value onto point cloud data included in the MMS data;

calculating a three-dimensional (3D) coordinate value corresponding to the 2D coordinate value based on the calculated height value; and generating the HD map of the road area of the aerial image in three dimensions based on the calculated 3D coordinate value, wherein the calculating the 3D coordinate value comprises:

when there is no MMS data corresponding to the 2D coordinate value of the detected object extracted from the aerial image, detecting MMS data corresponding to a proximity position nearest the extracted 2D coordinate value and having MMS data, and calculating the height value corresponding to the 2D coordinate value of the object on the road area by projecting the extracted 2D coordinate value onto the point cloud data of the detected MMS data corresponding to the proximity position, wherein the extracted 2D coordinate value is used to generate the HD map for the polygon and/or the road surface marking, wherein a height value of the polygon and/or the road surface marking is calculated based on the height value calculated for the lane marking, and wherein the method further comprises:

generating a top view image based on a driving image included in the MMS data; and updating the aerial image by arranging the generated top view image in chronological order on a position of the aerial image corresponding to an imaging position at which the driving image is captured, wherein the method for producing the HD map is performed using the updated aerial image.

2. The method of claim 1, wherein the detecting includes, when the object of the road area is detected from the aerial image, classifying the detected object by object type.

3. The method of claim 2, further comprising:
allocating road attribute information to the road area according to the detected object,
wherein the road attribute information includes link information and node information for electronically defining a shape of the road area.

4. The method of claim 2, further comprising: calculating dummy information and performing data processing for optimizing the generated HD map data by assigning the calculated dummy information as an attribute of the object.

5. The method of claim 4, wherein the dummy information includes an offset value corresponding to a distance difference from a reference lane marking and a relative height value corresponding to a height difference from the reference lane marking.

6. The method of claim 1, further comprising:
comparing the calculated height value with a surrounding height value to determine whether the calculated height value is an error; and
performing an error notification when the calculated height value is determined to be an error value.

7. The method of claim 1, further comprising:
detecting a road facility from a driving image included in the MMS data; and
extracting a 3D coordinate value of the detected road facility from the point cloud data included in the MMS data,
wherein, in the generating of the HD map, the HD map reflecting the road facility three-dimensionally is generated based on the detected image of the road facility and the extracted 3D coordinate value of the road facility.

8. A program stored in a non-transitory computer-readable recording medium to perform the method for producing the high-definition (HD) map according to claim 1.

9. A non-transitory computer-readable recording medium storing a program for performing the method for producing the high-definition (HD) map according to claim 1.

10. An apparatus for producing a high-definition (HD) map using an aerial image and mobile mapping system (MMS) data of an MMS, the apparatus comprising:
an aerial image analyzing unit detecting an object of a road area and at least one second object of the road area from the aerial image and extracting a two-dimensional (2D) coordinate value of the detected object from the aerial image, wherein the object of the road area is a lane marking and the at least one second object is at least one of a road surface marking and a polygon;
a space coordinate calculating unit calculating a height value corresponding to the 2D coordinate value by projecting the extracted 2D coordinate value onto point cloud data included in the MMS data, and calculating a three-dimensional (3D) coordinate value corresponding to the 2D coordinate value based on the calculated height value; and
an HD map generating unit generating the HD map of the road area of the aerial image in three dimensions based on the calculated 3D coordinate value,
wherein the space coordinate calculating unit detects MMS data corresponding to a proximity position nearest the extracted 2D coordinate value and having MMS data when there is no MMS data corresponding to the 2D coordinate value of the detected object extracted from the aerial image, and calculates the height value corresponding to the 2D coordinate value of the object of the road area by projecting the extracted 2D coordinate value onto the point cloud data of the detected MMS data corresponding to the proximity position,
wherein the extracted 2D coordinate value is used to generate the HD map for the polygon and/or the road surface marking,
wherein a height value of the polygon and/or the road surface marking is calculated based on the height value calculated for the lane marking, and
wherein the apparatus further comprises:
an aerial image updating unit generating a top view image based on a driving image included in the MMS data and updating the aerial image by arranging the generated top view image in chronological order on a position of the aerial image corresponding to an imaging position at which the driving image is captured,
wherein the apparatus produces the HD map using the updated aerial image.

11. The apparatus of claim 10, wherein the aerial image analyzing unit classifies, when the object of the road area is detected from the aerial image, the detected object by object type.

12. The apparatus of claim 11, further comprising: a road attribute information allocating unit allocating road attribute information to the road area according to the detected object,
wherein the road attribute information includes link information and node information for electronically defining a shape of the road area.

13. The apparatus of claim 10, wherein the space coordinate calculating unit determines whether the calculated height value is an error by comparing the calculated height value with a surrounding height value and performs an error notification when the calculated height value is determined to be an error value.

14. The apparatus of claim 10, further comprising:
a road facility detecting unit detecting a road facility from a driving image included in the MMS data,
wherein the space coordinate calculating unit extracts a 3D coordinate value of the detected road facility from the point cloud data included in the MMS data and the HD map generating unit generates the HD map reflecting the road facility three-dimensionally based on the detected image of the road facility and the extracted 3D coordinate value of the road facility.

15. The apparatus of claim 14, further comprising:

an HD map processing unit calculating dummy information and performing data processing for optimizing the generated HD map data by assigning the calculated dummy information as an attribute of the object.

16. The apparatus of claim 15, wherein the dummy information includes an offset value corresponding to a distance difference from a reference lane marking and a relative height value corresponding to a height difference from the reference lane marking.

* * * * *